(12) United States Patent
Kerestes

(10) Patent No.: US 11,209,121 B2
(45) Date of Patent: Dec. 28, 2021

(54) LIFTING SUPPORT DEVICE AND METHOD OF CONTROLLING OPERATION

(71) Applicant: The Boeing Company, Chicago, IL (US)

(72) Inventor: Jason Kerestes, Summerville, SC (US)

(73) Assignee: THE BOEING COMPANY, Chicago, IL (US)

( * ) Notice: Subject to any disclaimer, the term of this patent is extended or adjusted under 35 U.S.C. 154(b) by 739 days.

(21) Appl. No.: 15/138,710

(22) Filed: Apr. 26, 2016

(65) Prior Publication Data
US 2017/0307132 A1    Oct. 26, 2017

(51) Int. Cl.
| | | |
|---|---|---|
| *F16M 11/28* | (2006.01) | |
| *B66F 3/28* | (2006.01) | |
| *B66F 3/24* | (2006.01) | |
| *F16M 11/18* | (2006.01) | |
| *G05G 15/00* | (2006.01) | |
| *G05B 19/042* | (2006.01) | |

(52) U.S. Cl.
CPC ............. *F16M 11/28* (2013.01); *B66F 3/247* (2013.01); *B66F 3/28* (2013.01); *F16M 11/18* (2013.01); *G05G 15/007* (2013.01); *F16M 2200/00* (2013.01); *F16M 2200/047* (2013.01); *G05B 19/0426* (2013.01); *G05B 2219/25316* (2013.01)

(58) Field of Classification Search
CPC .... B23P 19/105; B25J 9/0045; B25J 17/0266; B23Q 3/04; Y10T 74/20305; Y10T 74/20341; F16M 11/28; F16M 2200/047; F16M 11/18; F16M 2200/00; B66F 3/28; B66F 3/247; B66F 3/24; B66F 3/25; B66F 3/00; G05G 15/007; G05B 2219/25316; G05B 2219/36429; G05B 19/0426; A61B 2034/30; A61G 7/1038; A61G 7/1019; G05D 15/01
USPC ......................................................... 414/5, 6
See application file for complete search history.

(56) References Cited

U.S. PATENT DOCUMENTS

| | | | | |
|---|---|---|---|---|
| 5,053,687 A | * | 10/1991 | Merlet | B25J 17/0216 |
| | | | | 318/566 |
| 5,915,673 A | * | 6/1999 | Kazerooni | B66C 1/62 |
| | | | | 212/285 |
| 5,987,726 A | * | 11/1999 | Akeel | B23P 19/105 |
| | | | | 29/407.08 |
| 6,330,837 B1 | * | 12/2001 | Charles | B25J 11/00 |
| | | | | 74/490.06 |

(Continued)

OTHER PUBLICATIONS

The Chas. E. Phipps Company; Monopod Pneumatic Overhead Chipping Tool; available at http://chasephipps.com/monopod-pneumatic-overhead-chipping-tool/; Cleveland, Ohio; last visited Apr. 5, 2016.

*Primary Examiner* — Mahdi H Nejad
(74) *Attorney, Agent, or Firm* — Armstrong Teasdale LLP

(57) ABSTRACT

A lifting support device that includes a linear actuator including a first end configured to support an object, and a load sensor positioned to determine application of a first load on the load sensor by at least the object. The linear actuator is maintained in equilibrium when supporting the first load. The lifting support device further includes a controller coupled in communication with the load sensor, and the controller is configured to selectively actuate the linear actuator in response to application of a second load on the load sensor.

8 Claims, 3 Drawing Sheets

(56) References Cited

U.S. PATENT DOCUMENTS

| | | | | |
|---|---|---|---|---|
| 6,370,970 B1* | 4/2002 | Hosokawa | B66C 13/18 | 73/816 |
| 6,386,513 B1* | 5/2002 | Kazerooni | B66C 1/0212 | 212/285 |
| 6,497,548 B1* | 12/2002 | Roy | B23Q 1/5462 | 409/201 |
| 6,632,159 B1* | 10/2003 | Slattery | A63B 21/078 | 482/4 |
| 6,681,880 B2* | 1/2004 | Bernhardt | G05G 9/047 | 172/442 |
| 7,172,385 B2* | 2/2007 | Khajepour | B25J 17/0266 | 414/735 |
| 7,953,509 B2* | 5/2011 | Murayama | B66C 1/0243 | 700/114 |
| 8,442,677 B2* | 5/2013 | Shoham | B25J 9/1623 | 700/245 |
| 8,500,823 B2* | 8/2013 | Herr | A61F 2/68 | 623/39 |
| 8,856,981 B1* | 10/2014 | Rayess | A61G 7/1011 | 5/83.1 |
| 2002/0113448 A1* | 8/2002 | Kazerooni | B25J 15/00 | 294/86.4 |
| 2003/0106230 A1* | 6/2003 | Hennessey | B25J 7/00 | 33/645 |
| 2007/0185418 A1* | 8/2007 | Mitsuishi | A61F 5/04 | 601/34 |
| 2010/0331150 A1* | 12/2010 | Patoglu | A63B 21/0004 | 482/79 |
| 2011/0101806 A1* | 5/2011 | Lovgren | F16H 25/2021 | 310/80 |
| 2013/0306384 A1* | 11/2013 | Baradat | B25J 9/0045 | 180/8.6 |
| 2014/0151947 A1* | 6/2014 | Brown | B25J 9/0045 | 269/58 |
| 2015/0248121 A1* | 9/2015 | Nilsson | B25J 9/1641 | 318/569 |
| 2015/0258679 A1* | 9/2015 | Izhikevich | G06N 20/00 | 700/250 |
| 2015/0258682 A1* | 9/2015 | Izikevich | B25J 9/0009 | 700/245 |
| 2016/0016309 A1* | 1/2016 | Swift | B25J 9/0075 | 623/24 |
| 2017/0225320 A1* | 8/2017 | Swift | B25H 1/0035 | |
| 2018/0325764 A1* | 11/2018 | Yagi | B25J 9/0006 | |
| 2019/0060150 A1* | 2/2019 | Saayman | A61G 7/1048 | |
| 2019/0076115 A1* | 3/2019 | Bax | F16M 11/14 | |

\* cited by examiner

LIFTING SUPPORT DEVICE AND METHOD OF CONTROLLING OPERATION

BACKGROUND

The field of the present disclosure relates generally to monopod support devices and, more specifically, to a lifting support device capable of single-handed actuation.

A variety of loads are typically lifted and set down by hand during installation, inspection, and repair processes, for example. When the load has a weight greater than a nominal value, repetitively lifting and setting down the load can result in muscle strain and fatigue. Moreover, requiring a technician to manually lift heavy loads increases the workload of the technician, thereby resulting in more frequent breaks, unfocused labor, and potentially poor quality work. At least some known support devices are available for supporting loads, and for enabling a technician to easily lift and access the loads. For example, one known support device is actuatable by a suitable power source to assist the technician in lifting heavy loads. More specifically, the support device includes an actuating trigger that, when released, causes the support device to hold the supported load in a static position. When pressed, the actuating trigger enables the technician to change the elevation of the load. However, when controlling the support device, the technician typically needs one hand to activate the actuating trigger, and the other hand to control the rate of elevation of the support device.

BRIEF DESCRIPTION

In one aspect, a lifting support device is provided. The lifting support device includes a linear actuator including a first end configured to support an object, and a load sensor positioned to determine application of a first load on the load sensor by at least the object. The linear actuator is maintained in equilibrium when supporting the first load. The lifting support device further includes a controller coupled in communication with the load sensor, and the controller is configured to selectively actuate the linear actuator in response to application of a second load on the load sensor.

In another aspect, a method of controlling operation of a linear actuator is provided. The method includes maintaining the linear actuator in equilibrium when supporting a first load, determining application of a second load on the linear actuator, and selectively actuating the linear actuator in response to application of the second load on the linear actuator.

In yet another aspect, a computer-readable storage media having computer-executable instructions embodied thereon for use in controlling operation of a linear actuator is provided. When executed by at least one processor, the computer-executable instructions cause the processor to maintain the linear actuator in equilibrium when supporting a first load, determine application of a second load on the linear actuator, and selectively actuate the linear actuator in response to application of the second load on the linear actuator.

DETAILED DESCRIPTION

The implementations described herein relate to a lifting support device capable of single-handed actuation. More specifically, the lifting support device described herein is capable of detecting external loads applied thereto, and responsively adjusting its height based on the external loads. For example, the lifting support device includes a controller that controls operation of a linear actuator supporting an object (i.e., a first load), such as a tool or other handheld device. The controller maintains the linear actuator in equilibrium when only the first load is applied to the linear actuator. Conversely, the controller selectively actuates the linear actuator in response to application of an external second load on the linear actuator. For example, in one implementation, the second load is induced by a technician pulling up or pushing down on the object for selective use and positioning thereof. As such, a length of the linear actuator is only modified when an external load is applied thereto, thereby providing a lifting and support tool that is effective and easy to use.

As used herein, an element or step recited in the singular and proceeded with the word "a" or "an" should be understood as not excluding plural elements or steps, unless such exclusion is explicitly recited. Furthermore, references to "exemplary implementation" or "one implementation" of the present disclosure are not intended to be interpreted as excluding the existence of additional implementations that also incorporate the recited features.

Figure 1:
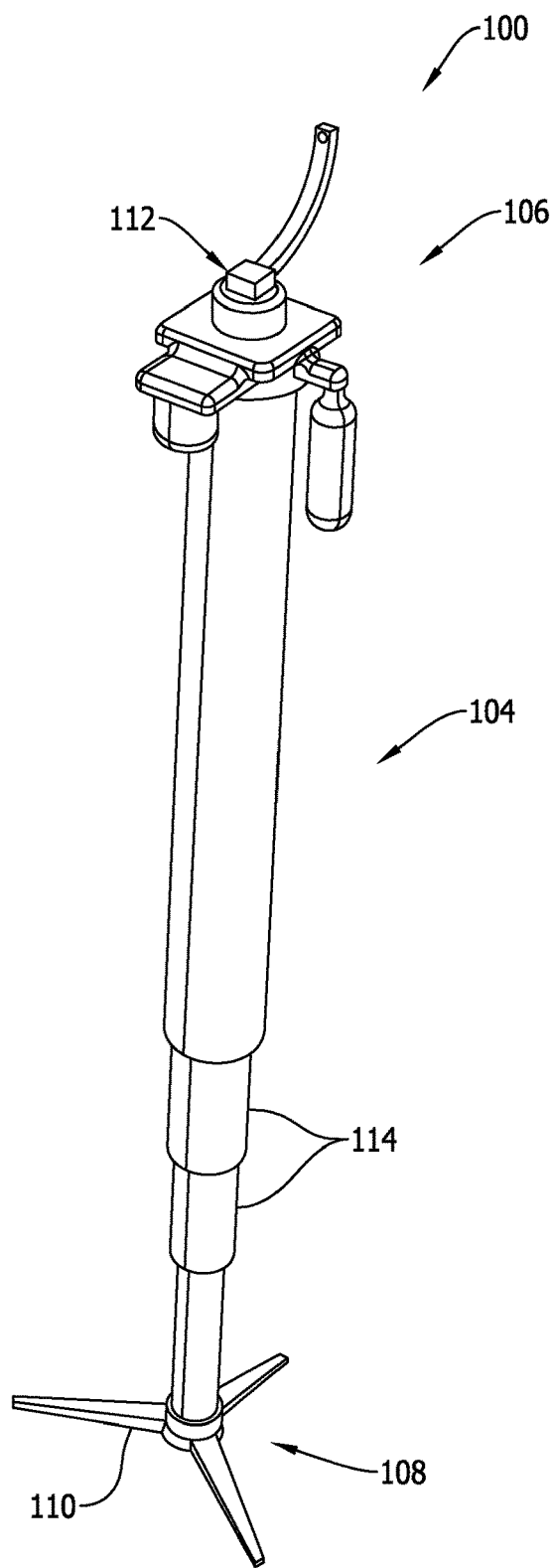
FIG. 1 is a perspective view of an exemplary lifting support device.
Figure 2:
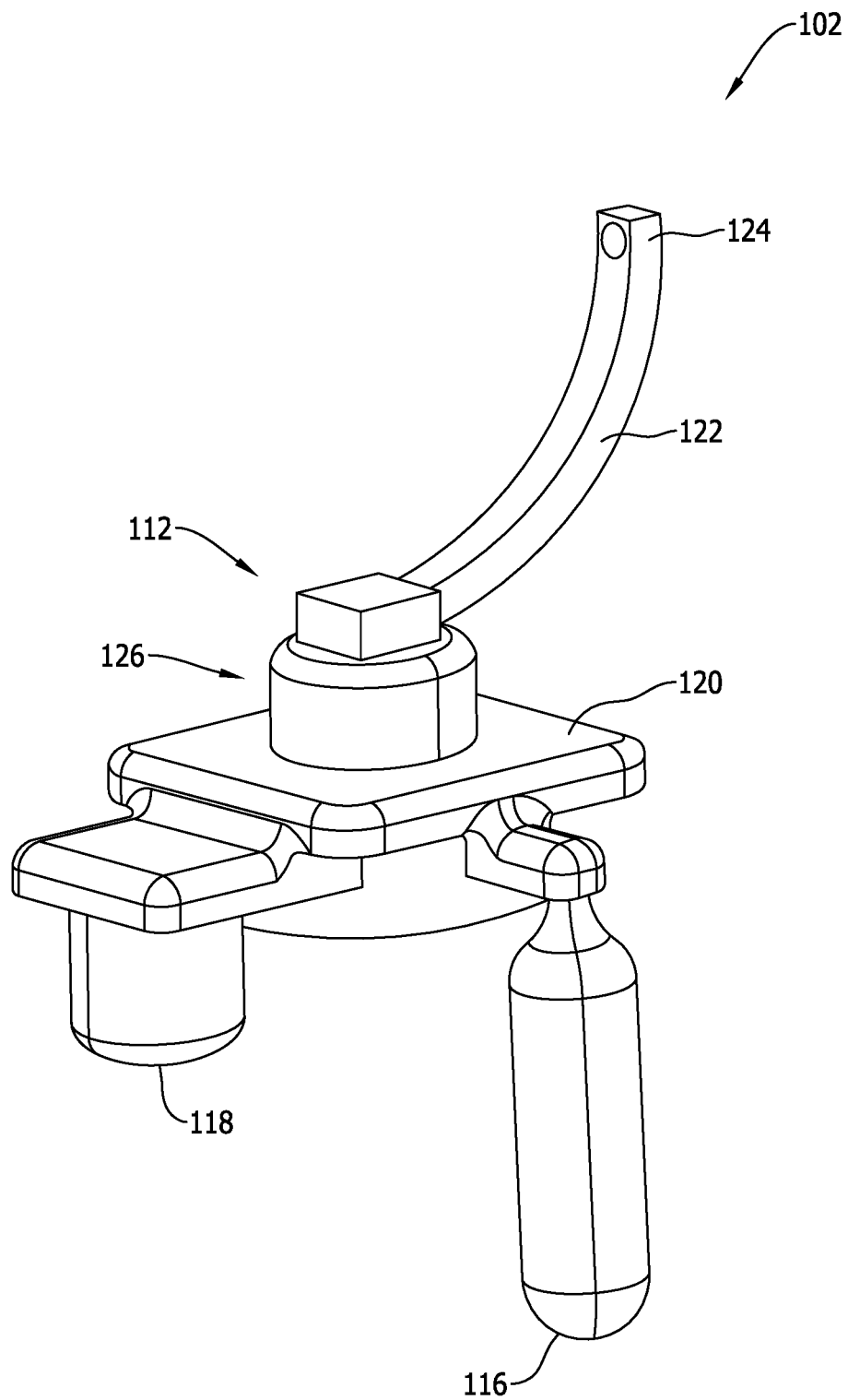
FIG. 2 is an enlarged perspective view of an exemplary actuation assembly that may be used with the lifting support device shown in FIG. 1.

FIG. 1 is a perspective view of an exemplary lifting support device 100, and FIG. 2 is an enlarged perspective view of an exemplary actuation assembly 102 that may be used with lifting support device 100. In the exemplary implementation, lifting support device 100 includes a linear actuator 104 including a first end 106 and a second end 108. Lifting support device 100 also includes a support base 110. First end 106 of linear actuator 104 is for supporting an object (not shown), and second end 108 of linear actuator 104 is engaged with support base 110 such that linear actuator 104 is freely rotatable relative to support base 110 in more than one axis. Moreover, in one implementation, second end 108 is engaged with support base 110 with an interference fit. As such, although freely rotatable, the interference fit enables linear actuator 104 to be selectively and statically oriented relative to support base 110.

Lifting support device 100 further includes a gimbal mount device 112 positioned at first end 106 of linear actuator 104. Gimbal mount device 112 is for mounting the object to linear actuator 104. More specifically, gimbal mount device 112 enables the object to freely rotate relative to first end 106 in more than one axis. As such, gimbal mount device 112 enables the object to be selectively oriented in varying positions to facilitate improved accessibility of the object for a user. In addition, lifting support device 100 includes a plurality of body segments 114 arranged telescopically with each other. The plurality of body segments 114 facilitate forming lifting support device 100 with a compact design that is selectively extendable and retractable, as will be explained in more detail below.

As described above, linear actuator 104 (shown in FIG. 1) is selectively actuatable in response to application of an external second load, other than a first load applied by at least the object, on linear actuator 104. Referring to FIG. 2, actuation assembly 102 facilitates controlling actuation of linear actuator 104. Linear actuator 104 is actuated with any suitable power source that enables lifting support device 100 to function as described herein. For example, linear actuator 104 may be actuated pneumatically, hydraulically, or with an electric motor. As shown, actuation assembly 102 includes a pressure reservoir 116 and a pressure regulator 118 for pneumatically actuating linear actuator 104. Pressure reservoir 116 is positioned onboard lifting support device 100, which enables lifting support device 100 to be independently operable from a power source. Alternatively, lifting support device 100 receives pneumatic fluid from a power source independently located from lifting support device 100.

Actuation assembly 102 also includes a support plate 120 and a support arm 122 extending from support plate 120. More specifically, support plate 120 houses gimbal mount device 112, and support arm 122 is coupled to gimbal mount device 112. Support arm 122 further includes a free end 124 for coupling to the object. As such, the object is indirectly coupled to gimbal mount device 112, and capable of movement as desired, as described above.

In the exemplary implementation, lifting support device 100 further includes a load sensor 126 positioned to determine application of a first load on load sensor 126 by at least the object. For example, the first load includes the mass of the object and any mounting hardware or other devices positioned for inducing a static load on load sensor 126. As shown, the object is mounted in series with load sensor 126 via support arm 122, such that the first load applied to and determined by load sensor 126 includes the mass of the object and support arm 122. As such, as will be explained in more detail below, load sensor 126 facilitates actuating linear actuator 104 when a second load is applied to load sensor 126 at either the object or support arm 122. In an alternative implementation, load sensor 126 is located at second end 108 (shown in FIG. 1) of linear actuator 104. Locating load sensor 126 at second end 108 enables load sensor 126 to determine application of loads at locations other than the object and support arm 122. As such, when positioned at second end 108, load sensor 126 facilitates actuating linear actuator 104 when the second load is applied to load sensor 126 at the object, support arm 122, or along the plurality of body segments 114 (shown in FIG. 1) of linear actuator 104.

Load sensor 126 is any sensing device that enables lifting support device 100 to function as described herein. An exemplary load sensor 126 includes, but is not limited to, a load cell device.

Figure 3:
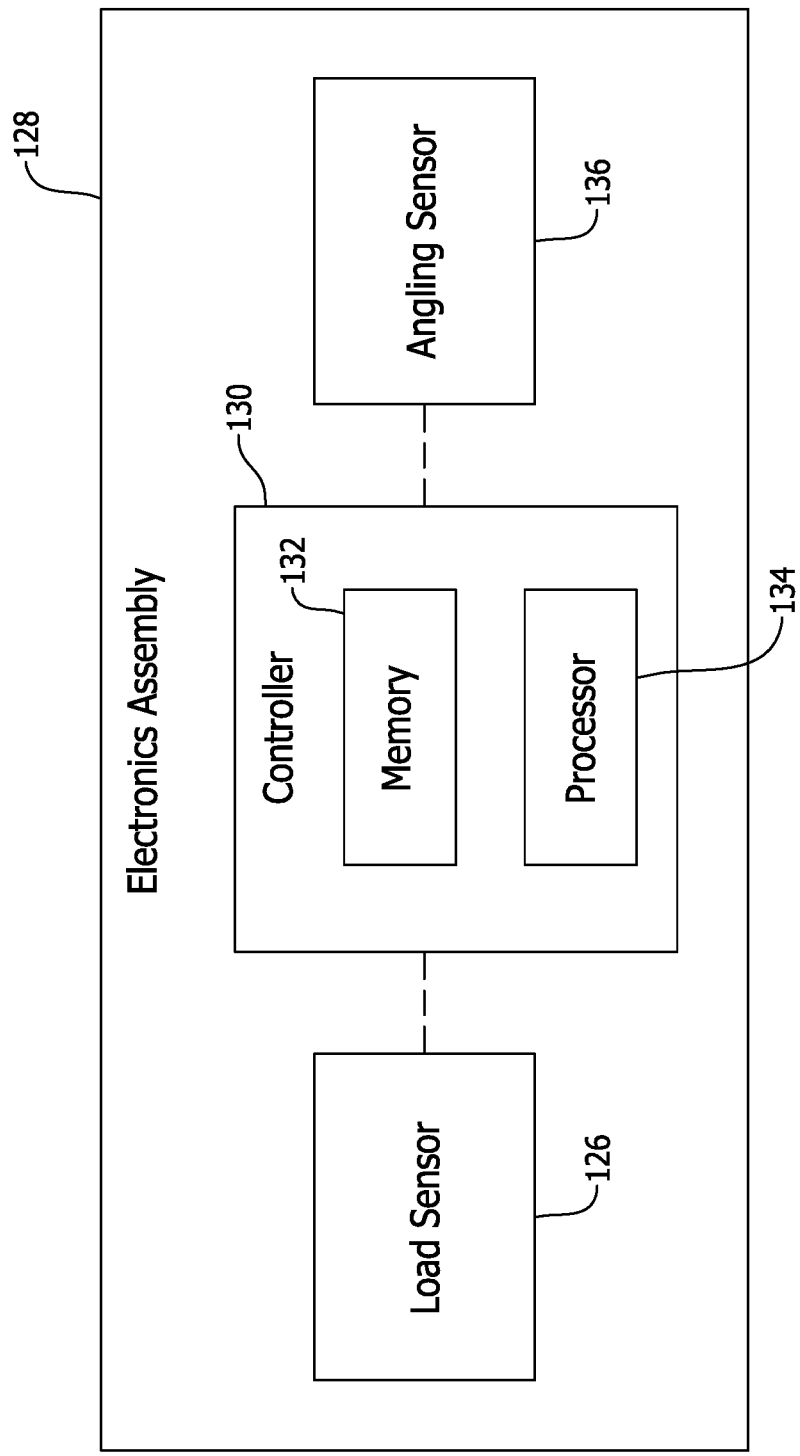
FIG. 3 is a schematic illustration of an exemplary electronics assembly that may be used with the actuation assembly shown in FIG. 2.

FIG. 3 is a schematic illustration of an exemplary electronics assembly 128 that may be used with actuation assembly 102 (shown in FIG. 2). In the exemplary implementation, electronics assembly 128 includes load sensor 126 and a controller 130 coupled in communication with load sensor 126. Controller 130 includes a memory 132 and a processor 134, including hardware and software, coupled to memory 132 for executing programmed instructions. Processor 134 may include one or more processing units (e.g., in a multi-core configuration) and/or include a cryptographic accelerator (not shown). Controller 130 is programmable to perform one or more operations described herein by programming memory 132 and/or processor 134. For example, processor 134 may be programmed by encoding an operation as executable instructions and providing the executable instructions in memory 132.

Processor 134 may include, but is not limited to, a general purpose central processing unit (CPU), a microcontroller, a microprocessor, a reduced instruction set computer (RISC) processor, an open media application platform (OMAP), an application specific integrated circuit (ASIC), a programmable logic circuit (PLC), and/or any other circuit or processor capable of executing the functions described herein. The methods described herein may be encoded as executable instructions embodied in a computer-readable medium including, without limitation, a storage device and/or a memory device. Such instructions, when executed by processor 134, cause processor 134 to perform at least a portion of the functions described herein. The above examples are exemplary only, and thus are not intended to limit in any way the definition and/or meaning of the term processor.

Memory 132 is one or more devices that enable information such as executable instructions and/or other data to be stored and retrieved. Memory 132 may include one or more computer-readable media, such as, without limitation, dynamic random access memory (DRAM), synchronous dynamic random access memory (SDRAM), static random access memory (SRAM), a solid state disk, and/or a hard disk. Memory 132 may be configured to store, without limitation, executable instructions, operating systems, applications, resources, installation scripts and/or any other type of data suitable for use with the methods and systems described herein.

Instructions for operating systems and applications are located in a functional form on non-transitory memory 132 for execution by processor 134 to perform one or more of the processes described herein. These instructions in the different implementations may be embodied on different physical or tangible computer-readable media, such as memory 132 or another memory, such as a computer-readable media (not shown), which may include, without limitation, a flash drive and/or thumb drive. Further, instructions may be located in a functional form on non-transitory computer-readable media, which may include, without limitation, smart-media (SM) memory, compact flash (CF) memory, secure digital (SD) memory, memory stick (MS) memory, multimedia card (MMC) memory, embedded-multimedia card (e-MMC), and micro-drive memory. The computer-readable media may be selectively insertable and/or removable from controller 130 to permit access and/or execution by processor 134. In an alternative implementation, the computer-readable media is not removable.

In operation, controller 130 is coupled in communication with the source of actuation for linear actuator 104 (e.g., pressure regulator 118 (shown in FIG. 2)) to control actuation of linear actuator 104. As described above, controller 130 is also coupled in communication with load sensor 126, and selectively actuates linear actuator 104 in response to application of a second load (i.e., a temporary mass) on load sensor 126. More specifically, a value of the first load applied to load sensor 126 is a static load (i.e., a goal mass), and controller 130 maintains linear actuator 104 in equilibrium when supporting only the first load. When the second load is applied to load sensor 126, controller 130 receives a signal from load sensor 126 that includes a value of the second load relative to a value of the first load. For example, in one implementation, load sensor 126 is calibrated such that the value of the second load is only provided to controller 130. More specifically, the value of the first load is subtracted from the value of a total load (i.e., combined values of the first load and the second load) induced on load sensor 126 before a load report is provided to controller 130.

Controller 130 also selectively actuates linear actuator 104 only when a difference between the value of the first load and the value of the second load is greater than a predetermined threshold. More specifically, when load sensor 126 is calibrated as described above, controller 130 selectively actuates linear actuator 104 only when the value of the second load is greater than a predetermined threshold. The predetermined threshold is selected based on a desired actuation sensitivity of linear actuator 104. For example, the predetermined threshold is selected such that controller 130 only actuates linear actuator 104 when the second load is intentionally applied to load sensor 126, thereby reducing the likelihood of inadvertent actuation of linear actuator 104.

Moreover, controller 130 selectively actuates linear actuator 104 based on whether the second load is a positive load or a negative load. A positive load generally results from a downward external force applied to load sensor 126, and a negative load generally results from an upward external force applied to load sensor 126. As such, a positive load increases the value of the total load applied to load sensor 126 (i.e., goal mass+temporary mass=positive change in mass), and a negative load decreases the value of the total load applied to load sensor 126 (i.e., goal mass+temporary mass=negative change in mass). Controller 130 then determines how to actuate linear actuator 104 based on whether a positive or a negative change in mass is detected by load sensor 126. More specifically, controller 130 causes linear actuator 104 to extend when the second load is a negative load, and causes linear actuator 104 to retract when the second load is a positive load. In addition, controller 130 varies the rate of extension and retraction of linear actuator 104 proportionally as a function of the value of the second load. For example, controller 130 extends and retracts linear actuator 104 at a faster rate as the value of the second load increases. As such, linear actuator 104 responsively adapts to perceived urgency based on the value of the second load.

In the exemplary implementation, electronics assembly 128 also includes an angling sensor 136 for determining an orientation and angling of linear actuator 104 relative to a vector of gravity. Angling sensor 136 may be any sensor that enables lifting support device 100 to function as described herein. Exemplary angling sensors include, but are not limited to, an accelerometer and a gyroscopic sensor. In an alternative implementation, load sensor 126 is a multi-axis load cell.

When lifting support device 100 is not in a purely vertical state, the value of the first load will be less than its value at calibration of load sensor 126. As such, angling sensor 136 operates either continuously or periodically to sample and detect the orientation of linear actuator 104 relative to the vector of gravity, and is in communication with controller 130 for compensating for changes in the detected load. In addition, controller 130 restricts actuation of linear actuator 104 when the angling of linear actuator 104 is greater than a maximum tilt angle. The maximum tilt angle is selected based on an angle of linear actuator 104 relative to the vector of gravity that will result in a zero load from the first load being applied to load sensor 126. Application of a zero load at an angle greater than the maximum tilt angle results in controller 130 initiating a paused error state, such that linear actuator 104 is not selectively extendable or retractable. The paused error state is lifted when the angle of linear actuator 104 returns to less than the maximum tilt angle.

Controller 130 also maintains linear actuator 104 in equilibrium when the second load is applied at a rate greater than a predetermined threshold. More specifically, application of the second load at a rate greater than a predetermined threshold is indicative of an abrupt and inadvertent strike on lifting support device 100 (e.g., a strike from a falling object). As such, controller 130 is able to distinguish an inadvertent strike from deliberate actuation-causing movement to reduce the likelihood of inadvertence actuation of lifting support device 100.

A method of controlling operation of linear actuator 104 is also provided. The method includes maintaining linear actuator 104 in equilibrium when supporting a first load, determining application of a second load on linear actuator 104 (i.e., load sensor 126 coupled to linear actuator 104), selectively actuating linear actuator 104 in response to application of the second load on linear actuator 104.

In one implementation, selectively actuating linear actuator 104 includes actuating linear actuator 104 only when a difference between a value of the first load and a value of the second load is greater than a predetermined threshold.

The method also includes determining angling of linear actuator 104 relative to a vector of gravity, and adjusting a value of the first load based on the angling of linear actuator 104. Further, the method includes restricting actuation of linear actuator 104 when the angling of linear actuator 104 is greater than a maximum tilt angle.

In some implementations, selectively actuating the linear actuator includes causing linear actuator 104 to extend when the second load applied to linear actuator 104 is a negative load, and causing linear actuator 104 to retract when the second load applied to linear actuator 104 is a positive load. Further, the method includes varying a rate of extension and retraction of linear actuator 104 proportionally as a function of the value of the second load. Moreover, selectively actuating linear actuator 104 includes maintaining linear actuator 104 in equilibrium when the second load is applied at a rate greater than a predetermined threshold.

This written description uses examples to disclose various implementations, including the best mode, and also to enable any person skilled in the art to practice the various implementations, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A lifting support device comprising:
 a linear actuator comprising a first end configured to support an object, and a second end opposite the first end to define a length of said linear actuator therebetween, and to define a height at which the object is lifted relative to the ground;
 a load sensor positioned to determine application of a first load on said load sensor by at least the object, wherein said linear actuator is maintained in equilibrium when supporting the first load; and
 a controller coupled in communication with said load sensor, said controller configured to selectively actuate said linear actuator in response to application of a second load on said load sensor, and configured to return said linear actuator to said equilibrium after the second load is removed, the controller configured to extend the linear actuator to increase the height of the object relative to the ground when the second load is a negative load, and the controller configured to retract the linear actuator to decrease the height of the object relative to the ground when the second load is a positive load.

2. The device in accordance with claim 1, wherein said controller is further configured to actuate said linear actuator only when a difference between a value of the first load and a value of the second load is greater than a predetermined threshold.

3. The device in accordance with claim 1 further comprising at least one of an accelerometer or a gyroscopic sensor configured to determine angling of said linear actuator relative to a vector of gravity, wherein said controller is configured to adjust a value of the first load based on the angling of said linear actuator.

4. The device in accordance with claim 1, wherein said linear actuator further comprises a plurality of body segments arranged telescopically with each other.

5. The device in accordance with claim 1 further comprising a gimbal mount device positioned at said first end of said linear actuator, said gimbal mount device configured for mounting the object to said linear actuator.

6. The device in accordance with claim 1 further comprising a support base, wherein said second end is configured to engage said support base such that said linear actuator is freely rotatable relative to said support base in more than one axis.

7. The device in accordance with claim 1, wherein said load sensor is a load cell device.

8. The device in accordance with claim 1, wherein said controller is further configured to vary a rate of extension and retraction of said linear actuator proportionally as a function of the value of the second load.

* * * * *